(12) United States Patent
Hayashi

(10) Patent No.: US 7,403,770 B2
(45) Date of Patent: Jul. 22, 2008

(54) TELEPHONE APPARATUS HAVING E-MAIL TRANSMITTING FUNCTION

(75) Inventor: Kazushige Hayashi, Higashiosaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 37 days.

(21) Appl. No.: 10/559,283

(22) PCT Filed: May 28, 2004

(86) PCT No.: PCT/JP2004/007742

§ 371 (c)(1),
(2), (4) Date: Apr. 18, 2006

(87) PCT Pub. No.: WO2004/110045

PCT Pub. Date: Dec. 16, 2004

(65) Prior Publication Data

US 2006/0245552 A1    Nov. 2, 2006

(30) Foreign Application Priority Data

Jun. 4, 2003    (JP) ............................. 2003-159735

(51) Int. Cl.
 *H04M 3/42*    (2006.01)
(52) U.S. Cl. .................. 455/417; 455/412.1; 455/412.2; 455/413; 455/414.1; 379/67.1; 379/88.12; 379/211.01; 379/211.02; 709/206; 709/207

(58) Field of Classification Search ............. 455/412.1, 455/412.2, 413, 414.1, 417; 379/67.1, 88.12, 379/211.01, 211.02, 212.01, 221.01; 709/206, 709/207

See application file for complete search history.

(56) References Cited

FOREIGN PATENT DOCUMENTS

| JP | 5-284210 | | 10/1993 |
|---|---|---|---|
| JP | 11-331412 | | 11/1999 |
| JP | 11331412 | A  * | 11/1999 |
| JP | 2002-9973 | | 1/2002 |
| JP | 2002009973 | A  * | 1/2002 |
| JP | 2002-51378 | A | 2/2002 |
| JP | 2002-57834 | | 2/2002 |
| JP | 2002-374328 | A | 12/2002 |
| JP | 2003-116175 | | 4/2003 |

* cited by examiner

*Primary Examiner*—Vincent P. Harper
*Assistant Examiner*—Dung Lam
(74) *Attorney, Agent, or Firm*—Westerman, Hattori, Daniels & Adrian, LLP.

(57) ABSTRACT

A telephone apparatus 100 having a mail transmitting function, comprising: a calling unit operable to originate a call to a phone number of a recipient; a response judging unit operable to judge whether a response to the call is returned; and a mail program control unit operable to start up a mail transmission program if the response judging unit judges in the negative.

6 Claims, 4 Drawing Sheets

FIG.2

| PHONE NUMBER | E-MAIL ADDRESS | NAME | GROUP | ADDRESS | CONFIGURATION INFORMATION |
|---|---|---|---|---|---|
| 090551NNNNN | 090551NNNNN@XXX.XX.XX | ABE○○ | FRIEND | ○○, ○○KU, TOKYO | YES |
| 090552NNNNN | 090552NNNNN@XXX.XX.XX | OKADA○○ | FRIEND | ○○, ○○KU, KYOTO CITY | YES |
| 090553NNNNN | 090553NNNNN@XXX.XX.XX | OKAYAMA○○ | FRIEND | ○○, ○○CHO, MATSUMOTO CITY | NO |
| 090554NNNNN | harada@XXX.XX.XX | HARADA○○ | BUSINESS | ○○, ○○CHO, HIROSHIMA CITY | NO |
| 090555NNNNN | 090555NNNNN@XXX.XX.XX | KANEKO○○ | FRIEND | ○○, ○○CHO, KOBE CITY | YES |
| ... | ... | ... | ... | ... | ... |
| 090558NNNNN | endou@XXX.XX.XX | ENDO○○ | BUSINESS | ○○, ○○CHO, KOBE CITY | NO |
| 090559NNNNN | 090559NNNNN@XXX.XX.XX | KAWAMURA○○ | BUSINESS | ○○, ○○CHO, KOBE CITY | YES |

FIG.3

DEAR ○○,

I HAVE CALLED YOU.
　　PLEASE CONTACT ME AT:
090-××××-△△△△

TARO SANYO

FIG.4

DEAR ○○,

I HAVE CALLED YOU.
I WILL CALL YOU BACK
　LATER, BECAUSE I CAN
NOT TAKE A CALL FOR
A WHILE
　　　　　　　　TARO SANYO

FIG.5

DEAR ○○,

I HAVE CALLED YOU.
PLEASE CONTACT ME AS
SOON AS POSSIBLE AT:
090-××××-△△△△

TARO SANYO

TELEPHONE APPARATUS HAVING E-MAIL TRANSMITTING FUNCTION

TECHNICAL FIELD

The present invention relates to a telephone apparatus having a mail transmitting function, and in particular to a telephone apparatus having a function for controlling a start-up timing of a mail program.

BACKGROUND ART

In recent years, answerphones and answerphone services using service centers have been rapidly spread. With such services, a caller can leave a message for a recipient in the case where the recipient is away, the recipient's portable telephone is turned off or the recipient's portable telephone is out of coverage, and the recipient can not take the call.

The recipient can check the message left by the caller after getting home, turning on the portable telephone, or getting back in coverage. The recipient can do what needs doing in accordance with the message.

Meanwhile, the time length for which the caller can record the message is usually limited. However, the caller is often not informed of the time length before the recording starts.

Accordingly, it frequently happens that the caller can not record the whole message within the recording time, and has to call again to convey the whole message.

As a conventional technique to solve this problem, a patent document (Japanese Laid-open Application Publication No.05-284210) discloses a technique to inform the caller of the recording time before a recording unit of the answerphone starts recording.

However, with this conventional technique, if the recording time is short, it might happen that the caller can not record the whole message within the recording time even after the caller is informed of the recording time. Also, if the message is basically long, the whole message might not be recorded within the recording time.

DISCLOSURE OF THE INVENTION

The object of the present invention is to provide a telephone apparatus capable of transmitting a massage to a recipient with simple operations using a mail in the case where the recipient is away, for instance, and the recipient can not take the call.

The present invention is a telephone apparatus having a mail transmitting function, comprising: a calling unit operable to originate a call to a phone number of a recipient; a response judging unit operable to judge whether a response to the call is returned; and a mail program control unit operable to start up a mail transmission program if the response judging unit judges in the negative.

In the case where the recipient is away, for instance, and the recipient does not answer the call, the stated structure enables the caller to transmit an e-mail to a contact address of the recipient with simple operations even if the caller can not leave a message in an answerphone of the recipient.

Here, the mail program control unit may include a recipient judging subunit operable to judge whether the recipient is a specific recipient, and the mail program control unit may start up the mail transmission program if the response judging unit judges in the negative and the judging subunit judges in the affirmative.

With the stated structure, the mail transmission program is started up only in the case where the specific recipient is away, for instance, and the recipient does not answer the call. Accordingly, the mail transmission program is started up only when needed, and the caller can send the message only to the specific recipient.

Here, the telephone apparatus may further comprise: a mail generation unit operable, if the recipient judging subunit judges in the affirmative, to generate an e-mail in accordance with an input from a caller after the mail transmission program is started up; and a transmission unit operable to specify an e-mail address of the specific recipient based on a recipient specifying table indicating an association among the specific recipient and a phone number and the e-mail address thereof, and to transmit the generated e-mail to the specified e-mail address, wherein the mail program control unit may include a table storing subunit operable to store the recipient specifying table, and the recipient judging subunit may judge whether the recipient is the specific recipient based on the recipient specifying table.

With the stated structure, in the case where the recipient does not answer the call, the caller can easily generate a message mail and transmit the mail to the e-mail address of the specific recipient without manually inputting the e-mail address of the recipient.

Here, the telephone apparatus may further comprise a message mail storing unit prestoring a predetermined message mail to be transmitted to the specific recipient, wherein the recipient specifying table may further include information indicating whether the mail generation unit should automatically generate the e-mail which is addressed to the specific recipient, the mail program control unit may further include an automatic mail generation judging subunit operable, if the recipient judging subunit judges in the affirmative, to judge whether the mail generation unit should automatically generate the e-mail addressed to the specific recipient based on the information associated with the telephone number of the recipient, and if the automatic mail generation judging subunit judges in the affirmative, the mail generation unit may generate the e-mail by reading the message mail from the message mail storing unit after the mail transmission program is started up, and if the automatic mail generation judging subunit judges in the negative, the mail generation unit may generate the e-mail in accordance with the input from the caller after the mail transmission program is started up.

With the stated structure, in the case where the prepared instruction indicates that the mail generation unit should automatically generate the e-mail addressed to the specific recipient, the caller is not required to newly generate a message mail, and can transmit the prestored message mail to the recipient. Accordingly, the caller can promptly transmit the message mail to the recipient. Even if the recipient is often away, the caller can avoid taking time to generate a new mail every time the recipient is away.

Here, the message mail storing unit may prestore, as the message mail, a request message for requesting the specific recipient to call back the caller, a notification message for notifying the specific recipient that the caller will call again, and an urgent request message for requesting the specific recipient to call back the caller as soon as possible, the mail generating unit may include an instruction receiving subunit operable, if the automatic mail generation judging subunit judges in the affirmative, to receive an instruction from the caller indicating which message mail should be selected, and the mail generating unit may generate the e-mail by reading out one of the request message, the notification message and the urgent request message from the message mail storing unit in accordance with the instruction.

With the stated structure, in the case where the specific recipient does not take the call, the caller can select one of the message mails which meets the purpose, and transmit the message to the recipient to convey an intended message to the recipient.

Here, the response judging unit may include a connection judging subunit operable to judge whether a call connection is established within a predetermined period, and the response judging unit may judge in the negative if the connection judging subunit judges in the negative.

In the case where the recipient is away, for instance, and the recipient does not answer the call, the stated structure enables the caller to transmit an e-mail to the contact address of the recipient with simple operations even if the caller can not leave a message in the answerphone of the recipient.

Here, the response judging unit may include: a time measuring subunit operable to measure a connection time if the connection judging subunit judges in the affirmative; a disconnection detecting subunit operable to detect that the call connection is disconnected; and a threshold value judging subunit operable to judge whether the connection time elapsed until the disconnection detecting subunit detects that the call connection is disconnected is smaller than the threshold value, and the response judging unit may judge in the negative if the threshold value judging subunit judges in the affirmative.

With the stated structure, whether the mail transmission program should be started up can be judged based on the length of the connection time between the time when the call connection is established and the time when it is disconnected. For instance, if the caller has left a voice message in an answerphone of the recipient, it can be judged based on the connection time that the response has been returned from the recipient (i.e. the connection time is not smaller than the threshold value), and if the caller has not been able to leave a voice massage in the answerphone of the recipient and has disconnected in a short time, it can be judged based on the connection time that the response has not been returned from the recipient (i.e. the connection time is smaller than the threshold value).

Therefore, the structure enables the mail transmission program to be started up only when the caller apparently cannot leave a voice message in the answerphone of the recipient. The mail transmission program can be controlled so as not be started up if the caller can leave a voice message in the answerphone.

Here, the telephone apparatus may further comprise a time obtaining unit operable to obtain a time when the e-mail is generated, wherein the recipient specifying table may further include a plurality of e-mail addresses associated with the phone number of the specific recipient, and a designated period for each of the e-mail addresses within which the recipient is reachable at the e-mail address, and the mail transmission unit may specify one of the e-mail addresses whose designated period includes the obtained time based on the recipient specifying table, and transmits the e-mail to the specified e-mail address.

Accordingly, if the recipient works in an office during the day and the PC at home and the portable telephone are turned off in the meantime, a message mail can be automatically transmitted to the e-mail address of the recipient's PC in the office. Therefore, the caller can avoid transmitting a message mail to the PC at home and the portable telephone, at which the recipient is unreachable during the time. Therefore, the caller can promptly receive a response from the recipient.

BRIEF DESCRIPTION OF THE DRAWINGS

FIG. 2 is a table showing an example of a Memory Dial;

FIG. 3 is an example of a request message for requesting the recipient to call back the caller;

FIG. 4 is an example of a notification message for notifying the recipient that the caller will call again;

FIG. 5 is an example of an urgent request message for requesting the recipient to call back the caller as soon as possible;

BEST MODE FOR CARRYING OUT THE INVENTION

The First Embodiment

<Structure>

A portable telephone apparatus according to the first embodiment of the present invention has a mail transmitting function.

Figure 1:
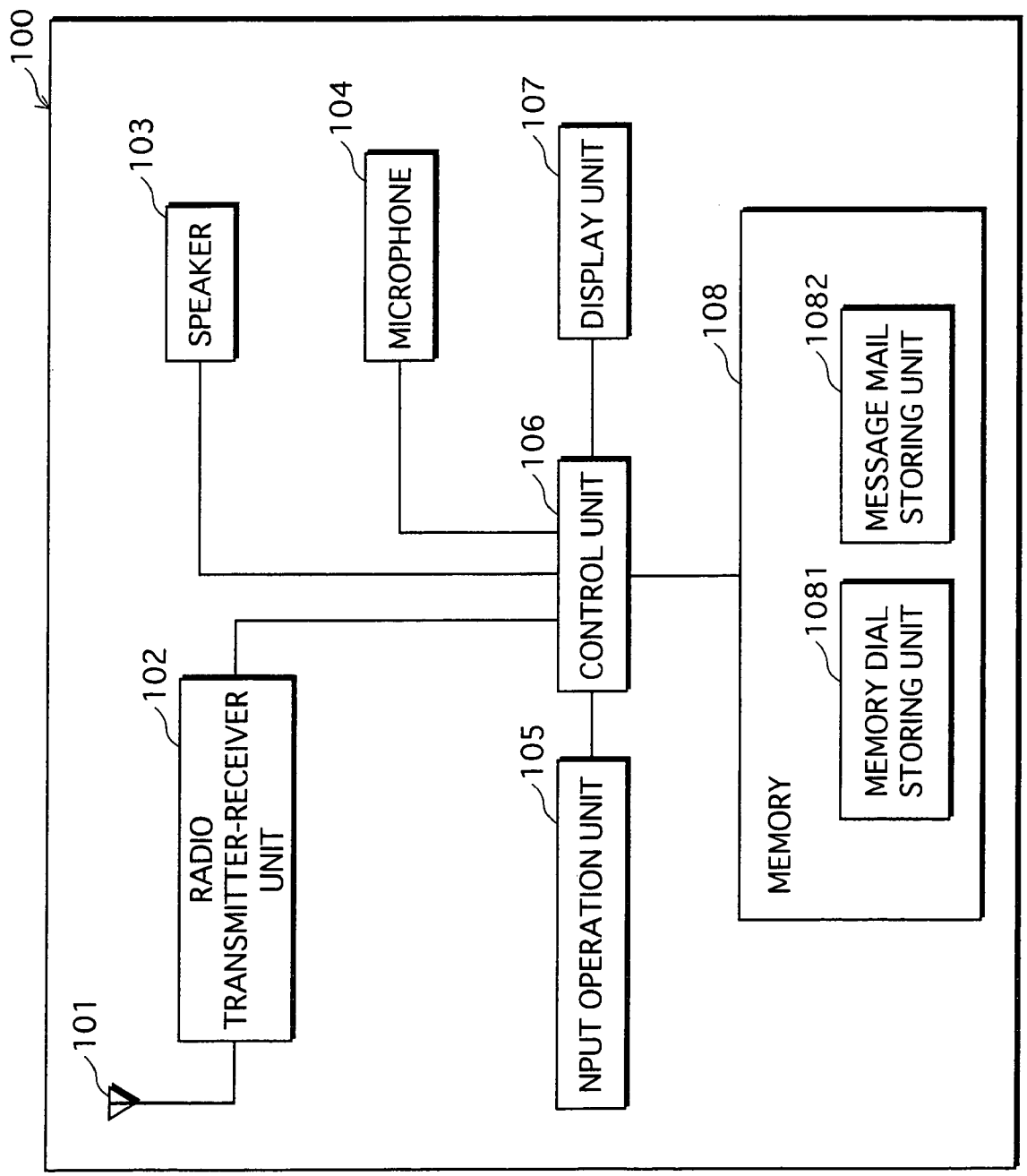
FIG. 1 is a functional block diagram showing a structure of a portable telephone apparatus 100 according to an embodiment of the present invention.

FIG. 1 is a functional block diagram showing a structure of a portable telephone 100 according to the first embodiment. As FIG. 1 shows, the portable telephone 100 includes an antenna 101, a radio transmitter-receiver unit 102, a speaker 103, a microphone 104, an input operation unit 105, a control unit 106, a display unit 107, and a memory 108.

The radio transmitter-receiver unit 102 demodulates radio waves input via the antenna 101 into communication data, and outputs the data to the control unit 106. The radio transmitter-receiver unit 102 modulates communication data input from the control unit 106 into radio waves, and transmits the radio waves via the antenna 101. Here, the "communication data" includes voice data of calls, character data of mails or the like, image data, and so on.

The speaker 103 outputs voices in accordance with the voice data output from the control unit 106.

The microphone 104 outputs the voice input by the caller, as voice signals, to the control unit 106.

The input operation unit 105 includes several keys such as a numeric keypad, a power key, a call start key and a call end key. The input operation unit 105 receives several instructions (e.g. a call start instruction for specifying a phone number to be called, a call end instruction, a mail receiving instruction, and a mail transmitting instruction) and data (e.g. characters) input by the caller via the keys, and outputs the instructions and the input data to the control unit 106.

The display unit 107 displays characters and images based on the character data and image data input from the control unit 106.

The memory 108 includes a Memory Dial storing unit 1081 and a message mail storing unit 1082.

The Memory Dial storing unit 1081 stores Memory Dial. The "Memory Dial" is a phone directory that includes a phone number, an e-mail address, a name, a group, an address and several types of information such as configuration information for each recipient previously registered by the caller.

The "e-mail address" is an e-mail address of the registered recipient, and a plurality of e-mail addresses may be registered. For instance, it may be the e-mail address of a PC (Personal Computer) at home, the e-mail address of a telephone at home having a mail transmitting function, or the e-mail address of a portable telephone.

The "group" is a name of the group to which the registered recipient belongs (e.g. "friend", "family", "business", etc.).

The "configuration information" indicates whether the message mail stored in the message mail storing unit 1082 should be read out to automatically generate a mail and transmit the mail to the recipient, if the recipient does not answer the call. In an example shown in FIG. 2, which is explained later, "YES" indicates that the mail should be transmitted and "NO" indicates that the mail should not be transmitted.

FIG. 2 is a specific example of the Memory Dial.

The Memory Dial storing unit 1081 stores therein a threshold value for a call connection judgment. The "threshold value" is used for judging whether the caller has left a message in the answerphone of the recipient, based on a connection time for which the caller has connected to the answerphone.

The message mail storing unit 1082 stores message mails.

The "message mails" have been previously generated and registered by the caller. One of the message mails is read out by the control unit 106 and transmitted to the e-mail address of the recipient, if the recipient does not answer the call and the configuration information of the recipient indicates "YES".

In this embodiment, it is assumed that three types of message mails, which are shown in FIG. 3, FIG. 4 and FIG. 5 respectively, are stored in the message mail storing unit 1082.

More specifically, the message mail storing unit 1082 stores a request message for requesting the recipient to call back the caller (FIG. 3), the notification message for notifying the recipient that the caller will call again (FIG. 4), and an urgent request message for requesting the recipient to call back the caller as soon as possible (FIG. 5).

The control unit 106 includes a microprocessor, a ROM (Read Only Memory), a RAM (Random Access Memory) and so on. The control unit 106 controls the whole portable telephone 100 according to a control program stored in the ROM.

The ROM stores a start-up control program for controlling the mail transmission program, and a mail transmitting and receiving program. The control unit 106 starts up and executes the start-up control program, and performs a mail transmission control, which is described next.

<Operations>

Figure 6:
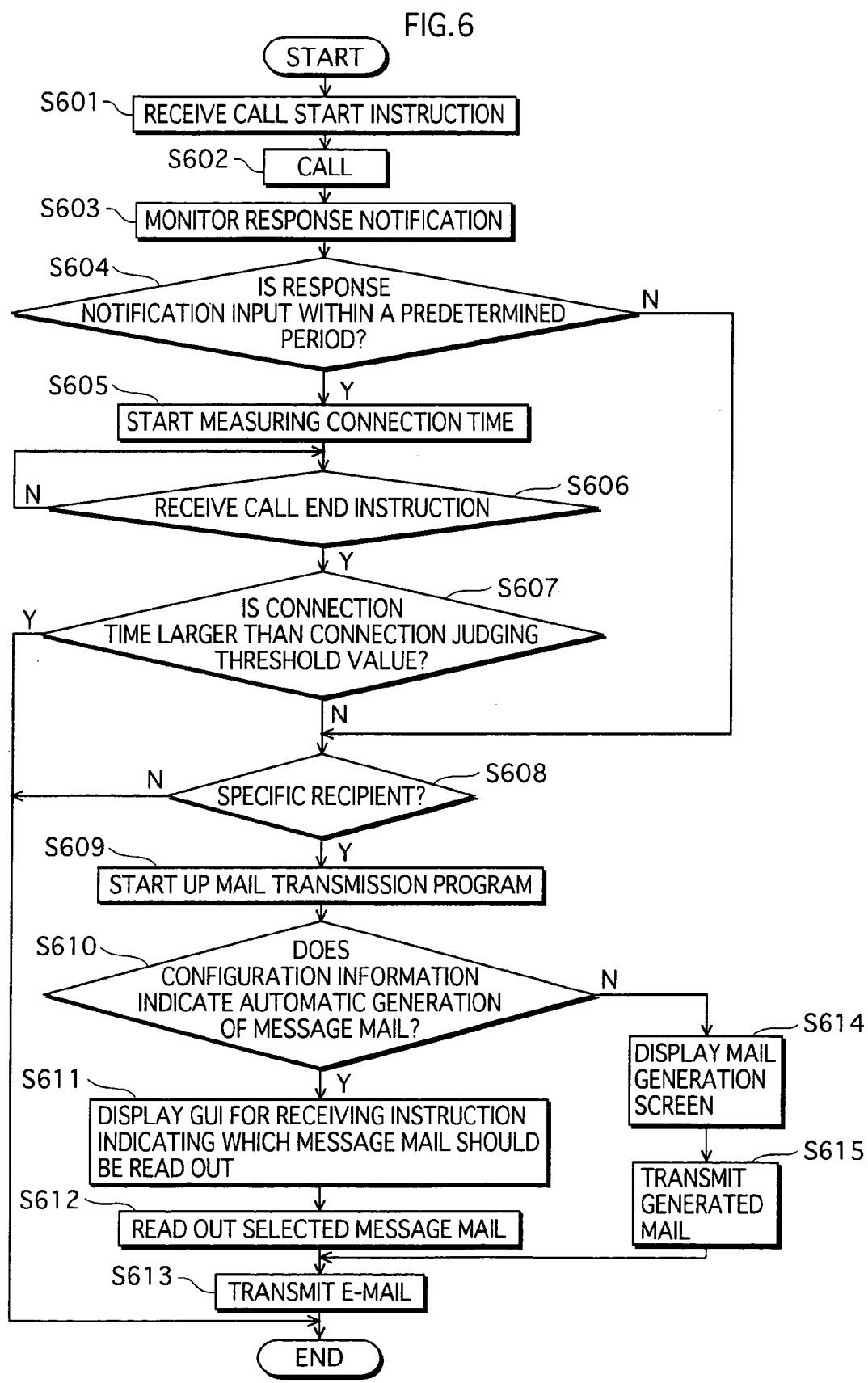
FIG. 6 is a flowchart showing a mail transmission control performed by a control unit 106.

FIG. 6 is a flowchart showing the operations for the mail transmission control, which are performed by the control unit 106. The following describes the operations with reference to the flowchart of FIG. 6.

Upon receiving the call start instruction from the input operation unit 105 (Step S601), the control unit 106 originate a call to a phone number of the recipient that is indicated by the call start instruction. More specifically, the control unit 106 attempts to connect to a base station via the radio transmitter-receiver unit 102, notifies a telephone network of the phone number via the base station, and calls the recipient (Step S602).

Further, the control unit 106 monitors a response notification, which notifies that a response to the call is returned, to be transmitted from the base station (Step S603), and judges whether the response notification is input to the radio transmitter-receiver unit 102 within a predetermined time (Step S604).

If the control unit 106 does not receives the response notification (Step S604: N), the control unit 106 reads out the Memory Dial from the Memory Dial storing unit 1081, and judges whether the recipient is a specific recipient, by judging whether the phone number indicated by the call start instruction is registered in the Memory Dial (Step S608).

If the recipient is the specific recipient (Step S608: Y), the control unit 106 starts up the mail transmission program (S609), and performs Step S610, which is described later.

In Step S604, if receiving the response notification (Step S604: Y), the control unit 106 starts measuring the connection time (Step S605). If detecting the call end, in other words, if detecting the call end:instruction input from the input operation unit 105 (Step S606: Y), the control unit 106 stops measuring the connection time, reads out the threshold value from the Memory Dial storing unit 1081, and judges whether the measured connection time is larger than the threshold value (Step S607).

If the connection time is not larger than the threshold value (Step S607: N), the control unit 106 judges that the caller has not left a message in the answerphone of the recipient, and performs Step S608. In Step S608, if it is judged that the recipient is a specific recipient (Step S608: Y), the control unit 106 starts up the mail transmission program (Step S609).

If the connection time is larger than the threshold value (Step S607: Y), the control unit 106 judges that the caller has left a message in the answerphone of the recipient, and finishes the mail transmission control.

Upon starting up the mail transmission program in Step S607, the control unit 607 reads out the Memory Dial from the Memory Dial storing unit 1081, and judges whether the configuration information of the phone number indicted by the call start instruction indicates automatic generation and transmission of the message mail (Step S610).

If the configuration information indicates the automatic generation and transmission of the message mail (Step S610: Y), the control unit 106 generates a GUI (Graphic User Interface) for receiving a selection by the caller, selecting one from three types of message mails stored in the message mail storing unit 1082, namely the request message, the notification message and the urgent request message. Then, the control unit 106 has the display unit 107 display the generated GUI (Step S611), reads out the message mail selected by the caller, according to the selection received via the GUI, from the message mail storing unit 1082 (Step S612), specifies the e-mail address of the recipient associated with the phone number indicated by the call start instruction, and transmits the selected message mail to the specified e-mail address (Step S613).

In Step S610, if the configuration information does not indicate the automatic generation and transmission of the message mail (Step S610: N), the control unit 106 has the display unit 107 display a mail generating screen (Step S614). Then, the control unit 106 generates a message mail based on character data for the message mail generation, which is input by the caller via the input operation unit 105 (Step S615), and performs Step S612.

If the recipient is not a specific recipient (Step S608: NO), the control unit 106 finishes the mail transmission control.

<Supplemental Description>

The portable telephone according to the present invention is described above based on the embodiment. However, the present invention is not limited to the embodiment.

(1) In the embodiment, the mail transmission control is performed by a portable telephone. However, the present invention is not limited to portable telephones. The mail transmission control may be performed by a telephone having the mail transmitting and receiving function and including the control unit 106 and the memory 108.

(2) In the embodiment, only one e-mail address of the recipient is registered in the Memory Dial. However, a plurality of e-mail addresses may be registered for each recipient, and each address may have information as to reachable period within which the recipient is reachable at the address.

If this is the case, during the mail transmission control, the control unit 106 obtains a time at which the message mail is generated, and specifies the e-mail address shown in FIG. 6, to which the control unit 106 transmits the message mail, by selecting an e-mail address whose reachable period includes the obtained time, from the plurality of e-mails, and transmits the message mail to the selected address in Step S611 shown in FIG. 6.

Accordingly, if the recipient works in an office during the day and a recipient's PC at home and a portable telephone are turned off in the meantime, a message mail can be automatically transmitted to the e-mail address of the recipient's PC in the office. Therefore, the caller can avoid transmitting a message mail to the PC at home and the portable telephone, which are unreachable during the time. Therefore, the caller can promptly receive a response from the recipient.

(3) In the embodiment, whether the recipient is the specific recipient is judged based on whether the recipient's phone number indicated by the call start instruction is registered in the Memory Dial (see Step S608 in FIG. 6). However, it may be judged by information previously set by the caller so as to indicate whether the recipient is the specific recipient. For instance, a data field for indicating the specific recipient may be prepared.

INDUSTRIAL APPLICABILITY

The present invention is applicable to a technique for controlling a start-up timing of a mail program in a telephone apparatus having a mail transmitting function.

The invention claimed is:

1. A telephone apparatus having a mail transmitting function, comprising:
a calling unit configured to originate a call to a phone number of a recipient;
a response judging unit configured to judge whether a response to the call is returned; and
a mail program control unit configured to start up a mail transmission program when the response judging unit judges in the negative;
a mail generation unit configured, when the recipient judging subunit judges in the affirmative, to generate an e-mail in accordance with an input from a caller after the mail transmission program is started up;
a transmission unit configured to specify an e-mail address of the specific recipient based on a recipient specifying table indicating an association among the specific recipient and a phone number and the e-mail address thereof, and to transmit the generated e-mail to the specified e-mail address, and
a message mail storing unit prestoring a predetermined message mail to be transmitted to the specific recipient,
wherein the mail program control unit includes a recipient judging subunit configured to judge whether the recipient is a specific recipient, and
the mail program control unit starts up the mail transmission program when the response judging unit judges in the negative and the judging subunit judges in the affirmative;
wherein the mail program control unit includes a table storing subunit configured to store the recipient specifying table, and
the recipient judging subunit judges whether the recipient is the specific recipient based on the recipient specifying table; and
wherein the recipient specifying table further includes information indicating whether the mail generation unit should automatically generate the e-mail which is addressed to the specific recipient,
the mail program control unit further includes an automatic mail generation judging subunit configured, when the recipient judging subunit judges in the affirmative, to judge whether the mail generation unit should automatically generate the e-mail addressed to the specific recipient based on the information associated with the telephone number of the recipient, and
when the automatic mail generation judging subunit judges in the affirmative, the mail generation unit generates the e-mail by reading the message mail from the message mail storing unit after the mail transmission program is started up, and when the automatic mail generation judging subunit judges in the negative, the mail generation unit generates the e-mail in accordance with the input from the caller after the mail transmission program is started up.

2. The telephone apparatus according to claim 1, wherein the response judging unit includes a connection judging subunit configured to judge whether a call connection is established within a predetermined period, and
the response judging unit judges in the negative when the connection judging subunit judges in the negative.

3. A telephone apparatus having a mail transmitting function, comprising:
a calling unit configured to originate a call to a phone number of a recipient;
a response judging unit configured to judge whether a response to the call is returned; and
a mail program control unit configured to start up a mail transmission program when the response judging unit judges in the negative, wherein
the mail program control unit includes a recipient judging subunit configured to judge whether the recipient is a specific recipient, and
the mail program control unit starts up the mail transmission program when the response judging unit judges in the negative and the judging subunit judges in the affirmative, wherein
the telephone apparatus further comprises:
a mail generation unit configured, when the recipient judging subunit judges in the affirmative, to generate an e-mail in accordance with an input from a caller after the mail transmission program is started up; and
a transmission unit configured to specify an e-mail address of the specific recipient based on a recipient specifying table indicating an association among the specific recipient and a phone number and the e-mail address thereof, and to transmit the generated e-mail to the specified e-mail address, wherein
the mail program control unit includes a table storing subunit configured to store the recipient specifying table, and
the recipient judging subunit judges whether the recipient is the specific recipient based on the recipient specifying table, wherein
the telephone apparatus further comprises:
a message mail storing unit prestoring a predetermined message mail to be transmitted to the specific recipient, wherein
the recipient specifying table further includes information indicating whether the mail generation unit should automatically generate the e-mail which is addressed to the specific recipient, the mail program control unit further includes an automatic mail generation judging subunit configured, when the recipient judging subunit judges in the affirmative, to judge whether the mail generation unit should automatically generate the e-mail addressed to the specific recipient based on the information associated with the telephone number of the recipient, and when the automatic mail generation judging subunit judges in the affirmative, the mail generation unit generates the e-mail by reading the message mail from the message mail storing unit after the mail transmission program is started up, and when the automatic mail generation judging subunit judges in the negative, the mail generation unit generates the e-mail in accordance with the input from the caller after the mail transmission program is started up, wherein the message mail storing unit prestores, as the message mail, a request message for requesting the specific recipient to call back the caller, a notification message for notifying the specific recipient that the caller will call again, and an urgent request message for requesting the specific recipient to call back the caller as soon as possible, the mail generating unit includes an instruction receiving subunit configured, when the automatic mail generation judging subunit judges in the affirmative, to receive an instruction from the caller indicating which message mail should be selected, and the mail generating unit generates the e-mail by reading out one of the request message, the notification message and the urgent request message from the message mail storing unit in accordance with the instruction.

4. A telephone apparatus having a mail transmitting function, comprising:

a calling unit configured to originate a call to a phone number of a recipient;

a response judging unit configured to judge whether a response to the call is returned; and a mail program control unit configured to start up a mail transmission program when the response judging unit judges in the negative;

wherein the response judging unit includes a connection judging subunit configured to judge whether a call connection is established within a predetermined period, and the response judging unit judges in the negative when the connection judging subunit judges in the negative, wherein the response judging unit includes:

a time measuring subunit configured to measure a connection time when the connection judging subunit judges in the affirmative;

a disconnection detecting subunit configured to detect that the call connection is disconnected; and a threshold value judging subunit configured to judge whether the connection time elapsed until the disconnection detecting subunit detects that the call connection is disconnected is smaller than the threshold value, and the response judging unit judges in the negative when the threshold value judging subunit judges in the affirmative.

5. A telephone apparatus having a mail transmitting function, comprising:

a table storing unit configured to store a recipient specifying table indicating an association among a specific recipient and a phone number and e-mail addresses thereof and a designated period for each of the e-mail addresses within which the recipient is reachable at the e-mail address;

a calling unit configured to originate a call to a phone number of a recipient;

a recipient judging unit configured to judge whether the recipient is the specific recipient;

a response judging unit configured to judge whether a response to the call is returned;

a mail program startup configured to start up a mail transmission program when the response judging unit judges in the negative and the recipient judging unit judges in the affirmative;

a mail generation unit configured to generate an e-mail to the specific recipient;

a time obtaining unit configured to obtain a time when the e-mail is generated, and a mail transmission unit configured to specify one of the e-mail addresses, and to transmit the e-mail when the obtained time falls within said designated period to the specified e-mail address.

6. A telephone apparatus having a mail transmitting function, comprising:

a calling unit configured to originate a call to a phone number of a recipient;

a response judging unit configured to judge whether a response to the call is returned; and a mail program control unit configured to start up a mail transmission program when the response judging unit judges in the negative, wherein the mail program control unit includes a recipient judging subunit configured to judge whether the recipient is a specific recipient, and the mail program control unit starts up the mail transmission program when the response judging unit judges in the negative and the recipient judging subunit judges in the affirmative, wherein the mail program control unit includes a table storing subunit configured to store a recipient specifying table indicating an association among the specific recipient and a phone number and an e-mail address thereof, and the recipient judging subunit judges whether the recipient is the specific recipient based on the recipient specifying table, wherein the telephone apparatus further comprises:

a mail generation unit configured, when the recipient judging subunit judges in the affirmative, to generate an e-mail in accordance with an input from a caller after the mail transmission program is started up; and a transmission unit configured to specify an e-mail address of the specific recipient based on a recipient specifying table, and to transmit the generated e-mail to the specified e-mail address, wherein the message mail storing unit prestores, as the message mail, a request message for requesting the specific recipient to call back the caller, a notification message for notifying the specific recipient that the caller will call again, and an urgent request message for requesting the specific recipient to call back the caller as soon as possible, and the mail generating unit generates the e-mail by reading out one of the request message, the notification message and the urgent request message from the message mail storing unit.

* * * * *